United States Patent
Okura

(10) Patent No.: US 9,464,734 B2
(45) Date of Patent: Oct. 11, 2016

(54) CORD-LIKE MEMBER HOLDER FOR WORKING MACHINE

(71) Applicant: KOBELCO CONSTRUCTION MACHINERY CO., LTD., Hiroshima (JP)

(72) Inventor: Hideyuki Okura, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/541,626

(22) Filed: Nov. 14, 2014

(65) Prior Publication Data

US 2015/0152980 A1   Jun. 4, 2015

(30) Foreign Application Priority Data

Nov. 29, 2013   (JP) ................................. 2013-247226

(51) Int. Cl.
*F16L 3/223* (2006.01)
*F16L 3/10* (2006.01)
(Continued)

(52) U.S. Cl.
CPC .......... *F16L 3/1083* (2013.01); *B60R 16/0215* (2013.01); *F16L 3/12* (2013.01); *H02G 3/22* (2013.01); *H02G 15/013* (2013.01)

(58) Field of Classification Search
CPC ......... F16L 3/1083; F16L 3/12; F16L 3/137; F16L 3/01; B60R 16/0215; H02G 3/22; H02G 3/32; H02G 15/013
USPC ....................................................... 248/74.2
See application file for complete search history.

(56) References Cited

U.S. PATENT DOCUMENTS 2,404,531 A * 7/1946 Robertson ............. F16L 3/2235
                                                        138/106
2,683,578 A * 7/1954 Rainey ................. H01B 17/306
                                                        174/146
(Continued)

FOREIGN PATENT DOCUMENTS

DE       18 30 666 U      5/1961
DE       34 40 103 A1     5/1986
(Continued)

OTHER PUBLICATIONS

Office Action issued Sep. 29, 2015 in Japanese Patent Application No. 2013-247226 (with English language translation).
(Continued)

*Primary Examiner* — Anita M King
(74) *Attorney, Agent, or Firm* — Oblon, McClelland, Maier & Neustadt, L.L.P.

(57) ABSTRACT

Provided is a cord-like member holder for holding a cord-like member inserted into a through-hole provided in a partition wall of an operator's cab of a working machine, including a grommet made of elastic material to have an inner peripheral surface surrounding a cord-like member insertion hole and a sealing surface, and a fixture. The fixture includes a clamp section to clamp the grommet to bring an inner peripheral surface of the grommet into close contact with an outer peripheral surface of the cord-like member, and a fixing section joined to the clamp section and fastened to the partition wall. The clamp section clamps the grommet while relative displacement of the clamp section to the grommet in a direction of approaching the partition wall is restrained, and the fixing section is fastened to the partition wall to bring the sealing surface into close contact with the partition wall.

5 Claims, 8 Drawing Sheets

(51) Int. Cl.
  *B60R 16/02*    (2006.01)
  *H02G 3/22*     (2006.01)
  *H02G 15/013*   (2006.01)
  *F16L 3/12*     (2006.01)

(56) References Cited

U.S. PATENT DOCUMENTS

| | | | | |
|---|---|---|---|---|
| 2,813,692 A * | 11/1957 | Peterson | ............... | H01B 17/306 174/152 R |
| 5,098,047 A * | 3/1992 | Plumley | ................ | F16L 3/2235 248/68.1 |
| 5,257,768 A * | 11/1993 | Juenemann | ........... | F16L 55/035 248/604 |
| 7,464,966 B2 * | 12/2008 | Miyajima | ................ | F16L 5/10 248/56 |
| 7,770,848 B2 * | 8/2010 | Johnson | ................ | F16L 3/1207 248/65 |
| 8,985,533 B2 * | 3/2015 | Edmond | ............... | F16L 3/1222 248/68.1 |

FOREIGN PATENT DOCUMENTS

| | | |
|---|---|---|
| JP | 61-81191 U | 5/1986 |
| JP | 61-84287 U | 6/1986 |
| JP | 3-77330 U | 8/1991 |
| JP | 2001-176346 | 6/2001 |
| JP | 2005-138746 A | 6/2005 |
| JP | 2005-229667 | 8/2005 |
| JP | 2011-105173 A | 6/2011 |
| JP | 2014-116997 A | 6/2014 |
| WO | WO 2009/125167 A1 | 10/2009 |

OTHER PUBLICATIONS

Extended European Search Report issued Mar. 30, 2015 in Patent Application No. 14194102.1.

* cited by examiner

CORD-LIKE MEMBER HOLDER FOR WORKING MACHINE

TECHNICAL FIELD

The present invention relates to a cord-like member holder for holding a cord-like member, such as a hose or a harness, routed so as to penetrate through a partition wall partitioning an inside and an outside of an operator's cab of a working machine while the holder being installed on the partition wall.

BACKGROUND ART

Various cord-like members arranged in a working machine include one type to be routed across an inside and an outside of an operator's cab, such as a piping hose interconnecting an operation device inside an operator's cab and a control valve outside the operator's cab. This type of cord-like member is routed in such a manner as to be inserted into a through-hole provided in a partition wall partitioning the inside and the outside of the operator's cab. Furthermore, in order to prevent the cord-like member from being moved by vibration of the working machine or the like to be thereby scraped against an inner peripheral edge of the partition wall defining the through-hole, used is a cord-like member holder to hold the cord-like member while being installed on the partition wall.

As such a cord-like member holder, there has been conventionally known a holder 80 shown in FIG. 11 and a holder 90 shown in FIG. 12. The holder 80 and the holder 90 are disclosed in JP 2001-176346 A (Patent Literature 1) and JP 2005-229667 A (Patent Literature 2), respectively, and either of them is designed to hold a cord-like member 110 routed in such a manner as to be inserted into a through-hole 102 provided in a partition wall 100 shown in FIGS. 11 and 12.

Specifically, the holder 80 shown in FIG. 11 includes a partition plate 81 and a grommet 82. The partition plate 81 is made of elastic material, including a plurality of through-holes 83 allowing a plurality of cord-like members 110 to be inserted into the respective through-holes 83. The grommet 82 includes a portion 84 for holding the partition plate 81, a basal portion 85 to be mounted on the partition wall 100, and an intermediate portion 86. The basal portion 85 is formed with an outer peripheral groove 87, and mounted on the partition wall 100 so as to receive an inner peripheral edge portion of the partition wall 100 around the through-hole 102 fitted into the outer peripheral groove 87.

The holder 90 shown in FIG. 12 includes a grommet 91 and a fixing frame 92. The grommet 91, made of elastic material to have a cylindrical shape enclosing a through-hole 93, integrally includes a small-diameter grommet body 94a and a large-diameter flange portion 95. The through-hole 93 has a diameter which allows the cord-like member 110 to be inserted into the through-hole 93 with no gap therebetween. The grommet body 94 has an outer diameter which allows the grommet body 94 to be fitted into the through-hole 102 of the partition wall 100, while the flange portion 95 has an outer diameter greater than an inner diameter of the through-hole 102. The fixing frame 92 is annular to surround a through-hole 96 having an inner diameter greater than an outer diameter of the cord-like member 110.

The grommet 91 is fixed to the partition wall 100 by use of the fixing frame 92 in a state where the cord-like member 110 has been inserted into the through-hole 93 of the grommet 91. Specifically, in a state where the grommet body 94 of the grommet 91 has been fitted into the through-hole 102 of the partition wall 100 and the flange portion 95 of the grommet 91 has been sandwiched between the fixing frame 92 and an inner peripheral edge portion of the partition wall 100 around the through-hole 102, the fixing frame 92 is fastened to the partition wall 100 by a bolt 98.

On such a cord-like member holder to be installed on a partition wall of an operator's cab of a working machine as described above, there are placed two requirements: holding a cord-like member reliably against vibration or the like; and securing high sealing performance of closing a through-hole of the partition wall into which the cord-like member is inserted, so as to prevent dust or the like from entering into the operator's cab. Neither of the holders (cord-like member holding assemblies) shown in FIGS. 11 and 12, however, is capable of satisfying both of the above two requirements at a high level.

Specifically, the holder 80 shown in FIG. 11, in which the basal portion 85 is mounted on the partition wall 100 by fitting the inner peripheral edge portion of the partition wall 100 around the through-hole 102 into the groove 87 formed in the base portion 85 of the grommet 82, cannot avoid occurrence of a vertical gap and a radial gap, which gaps may allow dust or the like to intrude into the operator's cab through the gaps. The vertical gap is formed between a part of the base portion 85 located just above and below the groove 87 and the partition wall 100, and the radial gap is formed between a partial region of an outer peripheral surface of the base portion 85 defining a bottom of the groove 87 and an inner peripheral surface of the partition wall 100 surrounding the through-hole 102.

The holder 90 shown in FIG. 12, meanwhile, involves difficulty in setting the inner diameter of the through-hole 93 so as to enable the grommet 91 to hold the cord-like member 110 reliably. Specifically, setting the inner diameter of the through-hole 93 to be greater than the outer diameter of the cord-like member 110 involves a gap between an inner peripheral surface of the grommet 91 surrounding the through-hole 93 and the outer diameter of the cord-like member 110, thus generating a possibility of allowing dust or the like to intrude into the operator's cab through the gap and making holding of the cord-like member 110 by the grommet 91 be unstable. On contrary, setting the inner diameter of the through-hole 93 to be less than the outer diameter of the cord-like member 110 in order to avoid the above disadvantage may involve difficulty in inserting the cord-like member 110 into the through-hole 93 depending on a dimensional difference therebetween. Such a diametrical dimension of the through-hole 93, formed in the grommet 91 made of elastic material, is significantly hard to accurately manage.

As regards the holder 90, it is also conceivable to set a fitting relationship between the through-hole 93 and the cord-like member 110 to be loose while setting a dimension of the grommet body 94 so as to cause the grommet body 94 to be press-fitted into the through-hole 102 of the partition wall 100 to thereby compress the grommet 91 radially of the through-hole 102 and thus bring the inner peripheral surface of the through-hole 93 into close contact with the outer peripheral surface of the cord-like member 110. This case, however, involves difficulty in managing a dimension of the outer diameter of the grommet body 94 relatively to the through-hole 102.

The above problems may be solved by addition of a sealing member and/or a fixing member to the holders 80, 90; however, the addition is undesirable because of involving structural complication and significant increase in cost.

SUMMARY OF INVENTION

It is an object of the present invention to provide an improved cord-like member holder for holding a cord-like member inserted into a through-hole provided in a partition wall of an operator's cab of a working machine, the holder being capable of achieving reliable holding of the cord-like member and reliable sealing in the through-hole, with a simple structure.

Provided is a cord-like member holder including: a grommet made of elastic material to have an inner peripheral surface surrounding a cord-like member insertion hole for allowing the cord-like member to be inserted thereinto and a sealing surface capable of making close contact with an inner peripheral edge portion of the partition wall around the through-hole, over an entire circumference of the inner peripheral edge portion; and a fixture for fixing the grommet to the partition wall while holding the grommet and bringing the sealing surface into close contact with the inner peripheral edge portion of the partition wall around the through-hole. The fixture includes: a clamp section configured to clamp the grommet at an outer side thereof to thereby elastically deform the grommet so as to bring the inner peripheral surface of the grommet into close contact with an outer peripheral surface of the cord-like member inserted into the cord-like member insertion hole of the grommet; and a fixing section joined to the clamp section so as to make an integral displacement with the clamp section and configured to be fastened to the partition wall in a fastening direction perpendicular to the partition wall to thereby fix the grommet to the partition wall. Furthermore, the clamp section is configured to clamp the grommet so as to be restrained from a relative displacement to the grommet in a direction of approaching the partition wall; and the fixing section is configured to be fastened to the partition wall in the fastening direction perpendicular to the partition wall to involve displacement of the clamp section and the grommet clamped by the clamp section in the fastening direction to thereby bring the sealing surface into close contact with the partition wall.

DESCRIPTION OF EMBODIMENTS

With reference to the drawings, there will be described preferred embodiments according to the invention.

Figure 1:
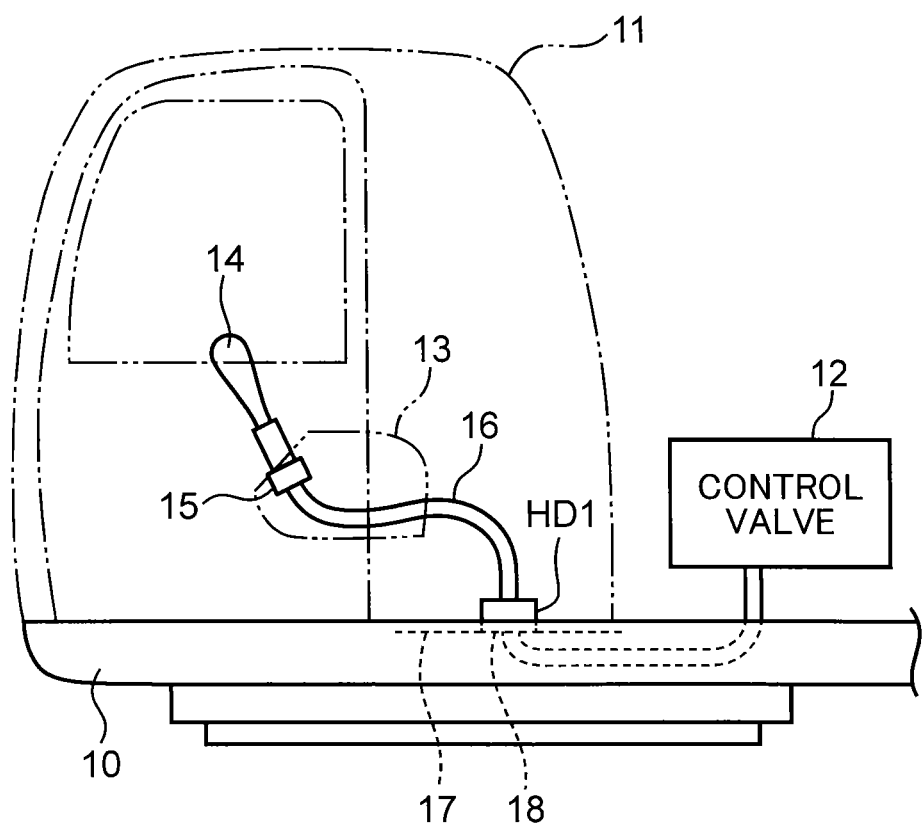
FIG. 1 is a side view showing a substantial part of a working machine employing a cord-like member holder according to a first embodiment of the present invention.
Figure 2:
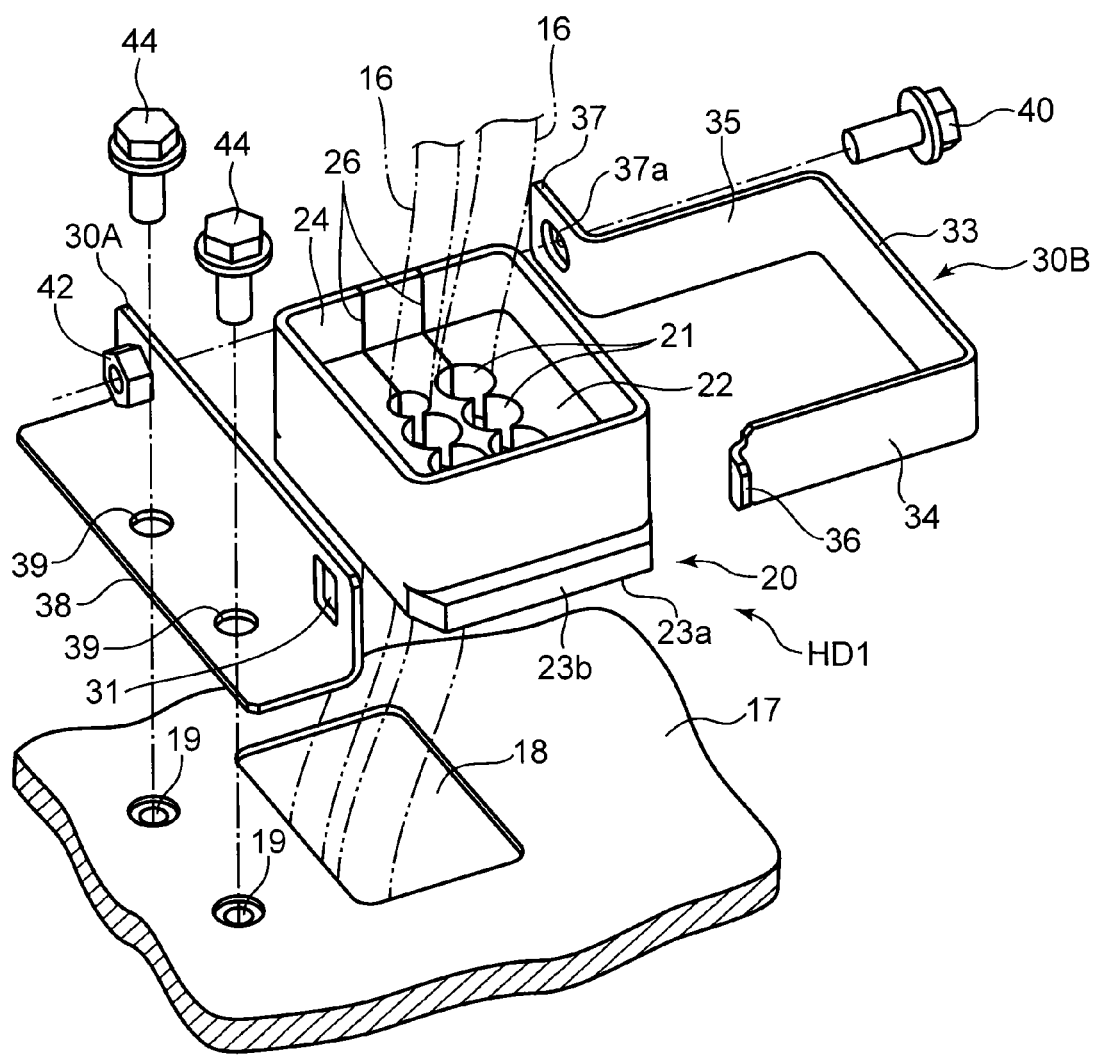
FIG. 2 is an exploded perspective view of the cord-like member holder according to the first embodiment.
Figure 3:
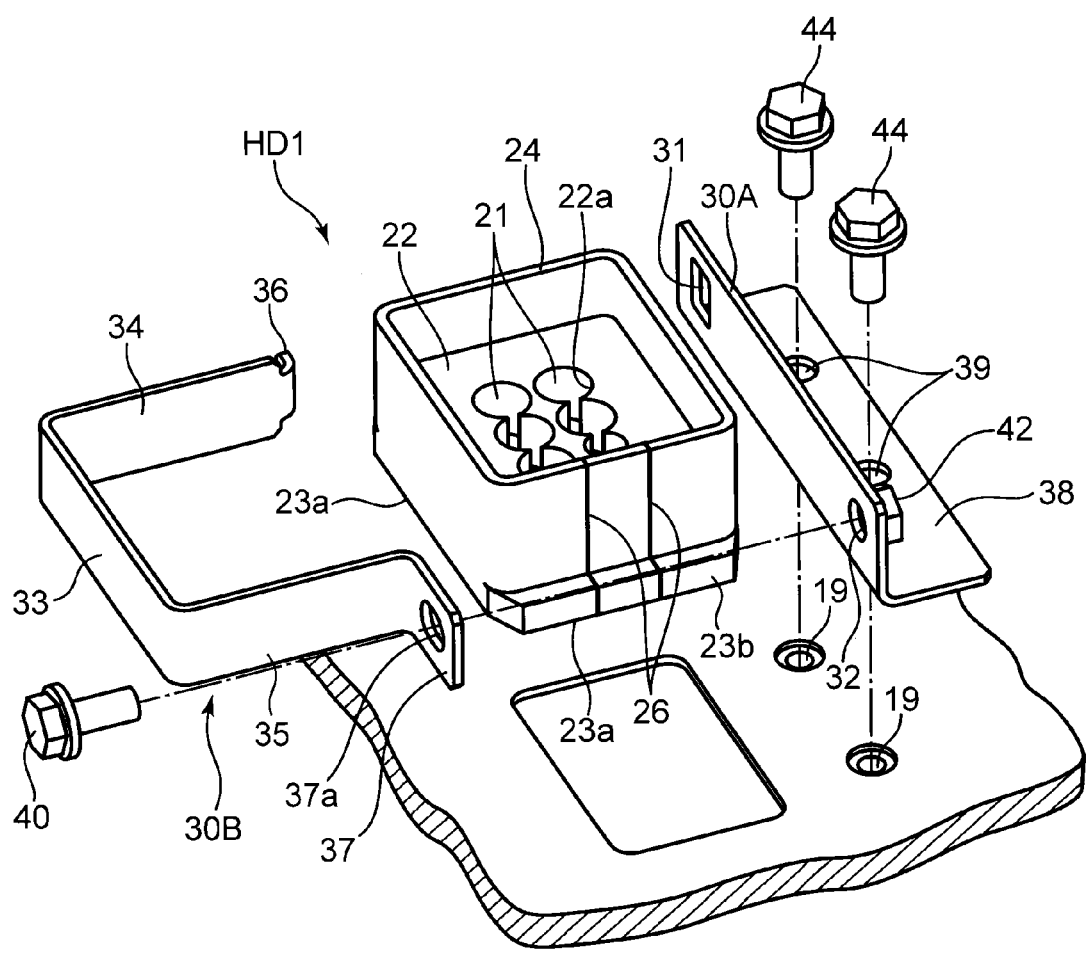
FIG. 3 is an exploded perspective view of the cord-like member holder, when viewed from the opposite side of a viewing position in FIG. 2.

FIG. 1 shows a substantial part of a working machine employing a cord-like member holder according to a first embodiment of the present invention. This working machine includes a slewable frame 10, an operator's cab 11 mounted on the slewable frame 10, and a control valve 12 mounted on the slewable frame 10 at a position rearward of the operator's cab 11. The operator's cab 11 is surrounded by a plurality of partition walls. The operator's cab 11 is internally provided with a non-shown operator's seat, and a control box 13 located at a side of the operator's seat. The control box 13 includes an operation lever 14 capable of being subjected to manual and rotational operation, and a pilot valve 15 configured to output a pilot pressure according to the manual operation applied to the operation lever 14. The pilot valve 15 is connected to the control valve 12 through a plurality of pilot hoses 16 each being a cord-like member.

Since the pilot valve 15 is located inside the operator's cab 11 while the control valve 12 is located rearward of, i.e., outside, the operator's cab 11, the pilot hoses 16 for interconnecting them should be routed so as to pass through one of the partition walls of the operator's cab 11. In this embodiment, the partition walls include a floor plate 17 formed with a through-hole 18, and the pilot hoses 16 are routed across an inside and an outside of the operator's cab 11 with an insertion into the through-hole 18. To hold the pilot hoses 16 while closing the through-hole 18 to seal the inside of the operator's cab 11, there is employed a holder HD1 corresponding to the cord-like member holder.

The cord-like member as an object to be held by the cord-like member holder according to the present invention is not limited to the above pilot hose. The cord-like member only has to be one routed through a partition wall of an operator's cab; for example, it may be another hydraulic pipe or water distribution pipe, or an electrical connection cable. Besides, the partition wall to which the cord-like member holder of the present invention should be fixed is not limited to the floor plate 17, but permitted to be any other partition wall such as a sidewall surrounding the operator's cab sidewise.

The holder HD1 according to the first embodiment includes a grommet 20 and a fixture, as shown in FIGS. 2 to 6. The fixture includes a first clamp member 30A, a second clamp member 30B, a fixing section 38, a bolt 40 and a nut 42 which constitute a clamping fastener, and a bolt 44 and a nut 46 which constitute an anchoring fastener.

The grommet 20 is made of elastic material such as rubber, integrally including a hose holding portion 22, a sealing portion 23, a contact prevention portion 24, and a positioning portion 25.

The hose holding portion 22 is a portion to make direct contact with the pilot hoses 16 to hold the pilot hoses 16, having a block-like shape (in the first embodiment, approximately rectangular parallelepiped shape) as a whole. The hose holding portion 22 is formed with a plurality of hose insertion holes 21 each vertically penetrating through the hose holding portion 22; the hose holding portion 22, therefore, has a plurality of inner peripheral surfaces 22a surrounding the respective hose insertion holes 21. The hose insertion holes 21, which allows the respective pilot hoses 16 to be inserted thereinto, has an inner diameter set to be approximately equal to an outer diameter of the pilot hose 16 so as to allow the inner peripheral surface 22a to make close contact with an outer peripheral surface of the pilot hose 16.

The number and arrangement of the hose insertion holes 21 are not particularly limited; the hose insertion holes 21 according to the first embodiment are formed in respective six positions. Specifically, the hose insertion holes 21 are arranged in two lines arranged in a first direction which is a horizontal direction along the floor plate 17 and indicated by the arrowed line A1 in FIG. 4. Each of the two lines includes three hose insertion holes 21 which are aligned in a second direction perpendicular to the first direction and indicated by the arrowed line A2 in FIG. 4.

The sealing portion 23 is located under the hose holding portion 22 and integrally joined to the hose holding portion 22. The sealing portion 23 has a frame shape surrounding an area in which the pilot hoses 16 is routed, having a lower surface serving as a sealing surface 23a capable of making into close contact with an upper surface of an inner peripheral edge portion of the floor plate 17 around the through-hole 18, over the entire circumference of the inner peripheral edge portion. The sealing portion 23 protrudes right-outward and left-outward beyond an outer side surface of the hose holding portion 22, the protruding portions forming respective right and left displacement restraint protrusions 23b. Each of the displacement restraint protrusions 23b has a function which will be described later.

Figure 5:
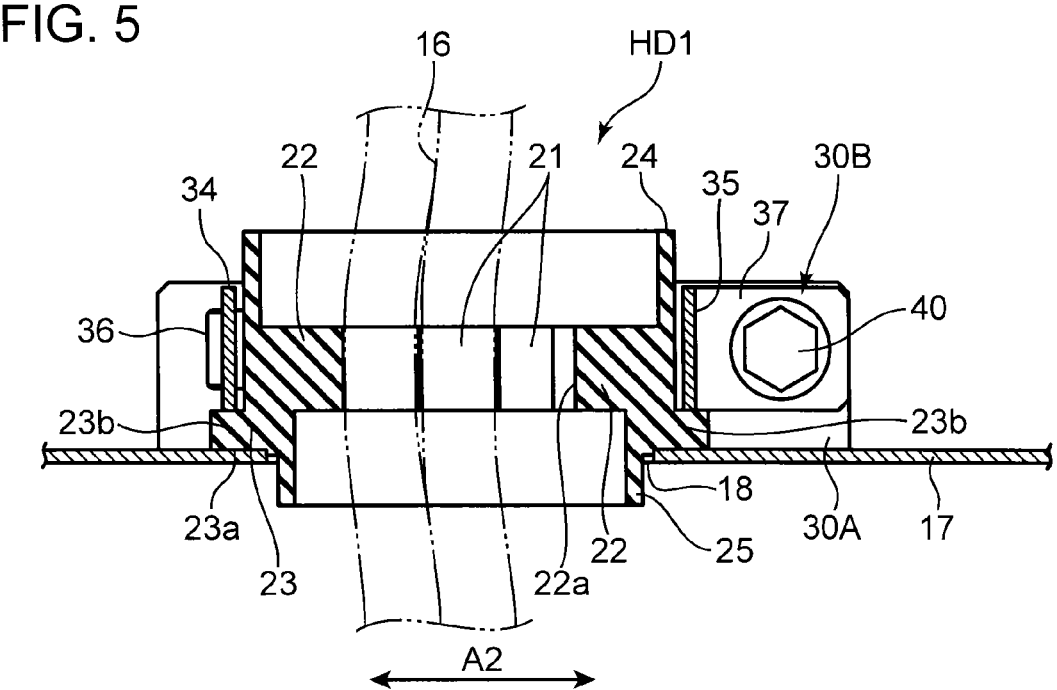
FIG. 5 is a sectional view along the line V-V in FIG. 4.
Figure 6:
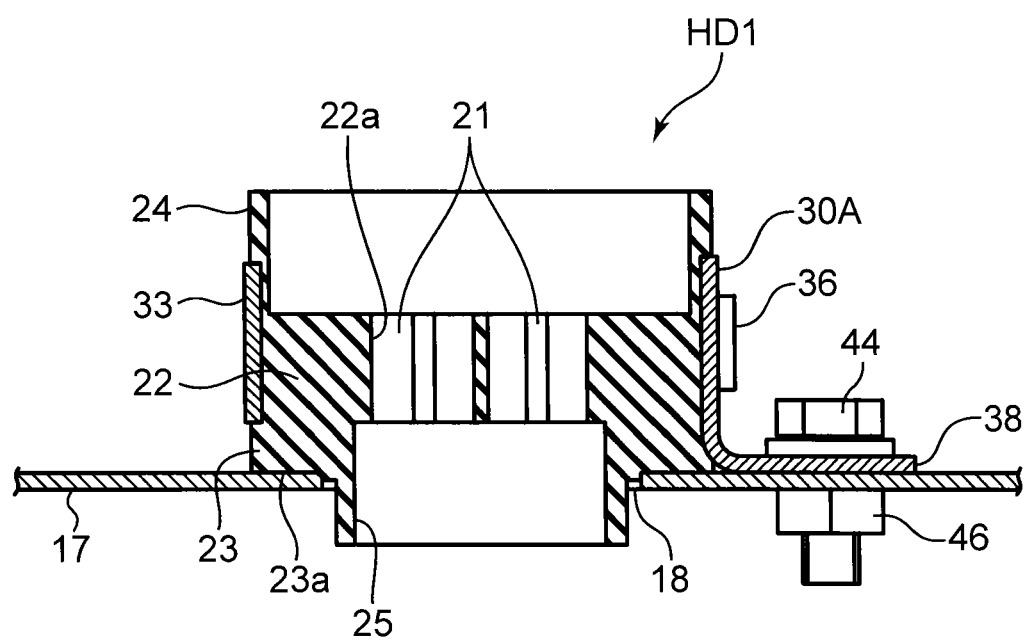
FIG. 6 is a sectional view along the line VI-VI in FIG. 4.

The contact prevention portion 24 is a portion for preventing the pilot hoses held by the hose holding portion 22 from contact with the first and second clamp members 30A, 30B. In the case of locating the end which is one end of each of the hose insertion holes 21 and is farther away from the floor plate 17 at a height position (in the first embodiment, a height position of an upper surface of the hose holding portion 22) lower than that of an upper edge surface of each of the first and second clamp members 30A, 30B, as shown in FIGS. 5 and 6, if the contact prevention portion 24 was absent, the reflection of the pilot hoses 16 inserted into the respective hose insertion holes 21 could bring the pilot hoses 16 into direct contact with the metal clamp members 30A, 30B made of metal material to thereby damage the pilot hose 16; in contrast, the contact prevention portion 24 shaped as a frame protruding upward beyond a periphery of the hose holding portion 22 reliably prevents the pilot hoses 16 from contact with the clamp members 30A, 30B.

The positioning portion 25 is designed to be loosely fitted into the through-hole 18 to thereby perform roughly positioning the grommet 20 with respect to the floor plate 17. The positioning portion 25 protrudes downward beyond the sealing portion 23 to have a frame shape surrounding the region where the pilot hoses 16 are routed, as with the sealing portion 24.

The grommet 20 in the first embodiment is provided with two slits 26 for facilitating insertion of the pilot hoses 16 into the respective hose insertion holes 21. The slits 26 are formed in the hose holding portion 22 so as to linearly extend across the hose insertion holes 21 in the respective lines, along the second direction (indicated by the arrowed line A2). One end portion of the slit 26 reaches an outer lateral surface of the grommet 20 across the sealing portion 23 and the contact prevention portion 24.

The slit 26 splits the grommet 20 in a direction perpendicular to an axial direction of each of the hose insertion holes 21 (in the first embodiment, in the first direction perpendicular to the second direction along which the slit 26 extends), thereby allowing the pilot hoses 16 to be inserted into the respective hose insertion holes 21 through the split part, that is, sideward of the grommet 20. The slit 26 may be one extending across the entire grommet 20, i.e., completely dividing the grommet 20 into a plurality of pieces.

The first clamp member 30A and the second clamp member 30B are configured to be fastened to each other to thereby clamp the grommet 20 at the outer sides thereof, thus functioning as a clamp section. The clamp section clamps the grommet 20 at opposite sides in the first direction, i.e., the direction in which the grommet 20 is split by the slit 26.

Specifically, the first clamp member 30A is shapes as a flat plate extending in the second direction, having a shape capable of coming into contact with the outer lateral surface of the grommet 20 at one of opposite sides thereof in the first direction (indicated by the arrowed line A1), in an upstanding posture. The first clamp member 30A has one end formed with an engagement hole 31 and the other end formed with a bolt insertion hole 32 for allowing the bolt 40 to be inserted thereinto. The nut 42 constituting the clamping fastener is fixed to an outer surface (surface on a side opposite to a surface facing the grommet 20) of the first clamp member 30A at such a position that a threaded hole of the nut 42 is aligned with the bolt insertion hole 32, by welding or the like.

The second clamp member 30B is also shaped as a plate, and has a strip shape surrounding the grommet 20 at the side opposite to the first clamp member 30A. Specifically, the second clamp member 30B integrally includes a clamp plate portion 33, a pair of side plate portions 34, 35, an engagement pawl portion 36, and a fastenable portion 37, while having an uniform height dimension (dimension in a direction parallel to the axial direction of each of the hose insertion holes 21) over the entire longitudinal region thereof.

The clamp plate portion 33 is a portion extending in a direction parallel to the first clamp member 30A, i.e., the second direction, and in an upstanding posture so as to come into contact with the outer lateral surface of the grommet 20 from the other side thereof opposite to the first clamp member 30A. The side plate portions 34, 35 are formed to extend from respective opposite ends of the clamp plate portion 33 toward the first clamp member 30A, alongside respective opposite side surfaces of the grommet 20, more specifically, while crossing over the respective displacement restraint protrusions 23b. Accordingly, the displacement restraint protrusions 23b can come into contact with respective lower edge surfaces of the side plate portions 34, 35 at respective upper surfaces of the displacement restraint protrusions 23b to thereby restrain the second clamp member 30B from downward relative displacement to the grommet 20 (that is, relative displacement in a direction of approaching the floor plate 17 as a partition wall).

In other words, the displacement restraint protrusions 23b, each of which is a portion protruding outward beyond the outer surface of the hose holding portion 22 which is a clampable portion to be clamped by the first and second clamp members 30A, 30B, are configured to make contact with the first and second clamp members 30A, 30B, respectively, to thereby achieve positioning the first and second clamp members 30A, 30B relatively to the grommet 20 and restraining the first and second clamp members 30A, 30B from the downward displacement relative to the grommet 20.

The engagement pawl portion 36, which is a portion to be engaged with the first clamp member 30A, protrudes outward beyond one end of the side plate portion 34 on a side opposite to the clamp plate portion 33. The engagement pawl portion 36 can be locked to the first clamp member 30A by the contact with the outer surface of the first clamp member 30A in a state of insertion of the side plate portion 34 from an inner side (the grommet 20 side) into the engagement hole 31 of the first clamp member 30A.

The fastenable portion 37, which is a portion to be fastened to the first clamp member 30A, protrudes outward beyond one end of the side plate portion 33 on a side opposite to the clamp plate portion 33. The fastenable portion 37 is formed with a bolt insertion hole 37a for allowing the bolt 40 to be inserted into the bolt insertion hole 37a. The bolt 40 can be screwed and tightened to the nut 42 while inserted into the bolt insertion hole 37a of the second clamp member 30B and the bolt insertion hole 32 of the first clamp member 30A, thereby fastening the fastenable portion 37 to the first clamp member 30A.

The side plate portions 34, 35 have respective lengths, i.e., a dimension in the first direction, which satisfies the following conditions:
  (a) the lengths enable the clamp plate portion 33 and the first clamp member 30A to clamp the grommet 20 in the first direction by locking the engagement pawl portion 36 to the first clamp member 30A through the engagement hole 31 and fastening the fastenable portion 37 to the first clamp member 30A; and
  (b) the lengths enables the grommet 20 to be elastically deformed enough to bring the inner peripheral surfaces 22a of the hose holding portion 22 of the grommet 20 into close contact with respective outer peripheral surfaces of the pilot hoses 16 over the entire circumference thereof, irrespective of the presence of the slits 26.

Besides, the distance between the side plate portions 34, 35 in the second direction is set to be slightly greater than the dimension of the grommet 20 in the second direction. This setting is to make allowance for allowing the grommet 20 to be expanded in the second direction involved by the compression of the grommet 20 in the first direction due to the clamp thereof by the first and second clamp members 30A, 30B.

The fixing section 38, which is a portion to be fastened to the floor plate 17 in a direction perpendicular to the floor plate 17, is integrally formed with the first clamp member 30A according to the first embodiment. The fixing section 38 extends in the second direction together with the first clamp member 30A and extends outward (toward a side opposite to the grommet 20) from a lower edge of the first clamp member 30A. The fixing section 38 in the first embodiment, thus, constitutes an L-shaped cross-section in cooperation with the first clamp member 30A. In other words, in the first embodiment, the first clamp member 30A and the fixing section 38 is composed of a single plate member having the L-shaped cross-section.

The fixing section 38 is formed with a plurality of bolt insertion holes 39 aligned longitudinally thereof. Meanwhile, the floor plate 17 is formed with a plurality of bolt insertion holes 19 at respective positions corresponding to the bolt insertion holes 39, and there are fixed a plurality of the nuts 46 as shown in FIG. 6 to a lower surface of the floor plate 17 at respective positions aligned with the bolt insertion holes 19, by welding or the like. Accordingly, the fixing section 38 can be fastened to the floor plate 17 along a thickness direction of the fixing section 38, i.e., the up-down direction, by inserting the bolt 44 constituting the anchoring fastener into each of the sets of the bolt insertion hole 39 and the bolt insertion hole 19 from the upper side thereof and screwing the bolt 44 into each of the nuts 46 and tightening.

The height dimension of the sealing portion 23 of the grommet 20, i.e., the dimension between the upper surface of each of the displacement restraint protrusions 23b of the sealing portion 23 and the sealing surface 23a of the sealing portion 23, is set so as to allow fastening the fixing section 38 to the floor plate 17 in a state of contact of the lower edge surface of each of the side plate portions 34, 35 with the upper surface of each of the displacement restraint protrusions 23b to press the sealing surface 23a against the upper surface of the inner peripheral edge portion of the floor plate 17 around the through-hole 18 with close contact thereof with each other involving elastic deformation of the grommet 20. Specifically, the displacement restraint protrusion 23b has a height dimension set to be slightly greater than a vertical distance between the lower edge surface of each of the side plate portions 34, 35 and a lower surface of the fixing section 38.

In this specification, the phrase "the fixing section is integrally joined to the clamp section" does not intend to limit the invention to an embodiment where the two sections are composed of a single member. The fixing section and the clamp section only have to be joined to each other so as to make integral displacement relative to the grommet 20 involved by fastening the fixing section is fastened to the partition wall; for example, the fixing section and the clamp section may be fixed to each other by use of a faster or any other suitable coupling device.

Next will be described a usage procedure and functions of the holder HD1. The holder HD1 can be used, for example, in the following procedure.

1) Into the through-hole 18 of the floor plate 17 as a partition wall, the pilot hoses 16 are inserted.

Figure 4:
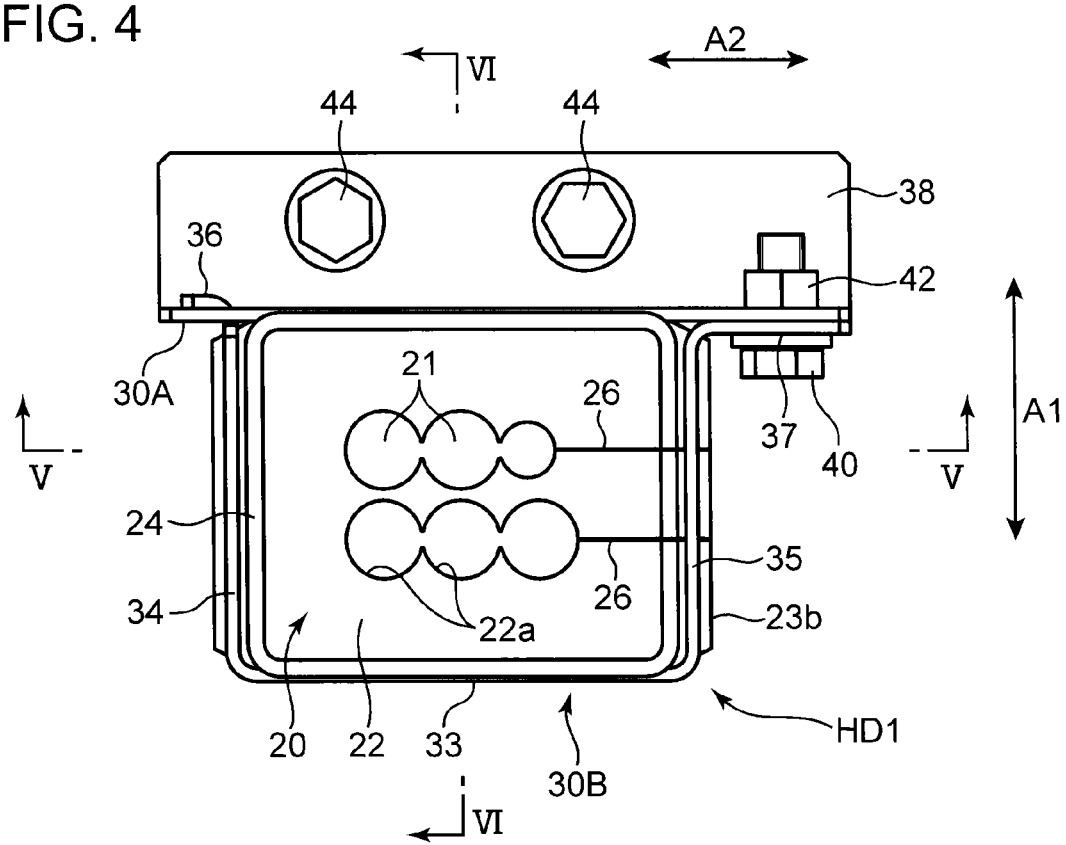
FIG. 4 is a top plan view of the cord-like member holder.

2) The grommet 20 is opened along the slits 26, and the pilot hoses 16 are inserted into the respective hose insertion holes 21 sideward of the grommet 20, i.e., in a direction which is perpendicular to an axial direction of each of the pilot hoses 16 and indicated by the arrowed line A2 in FIG. 4. The pilot hoses 16 is thus brought into a state of having been inserted into the respective hose insertion holes 21.

3) The first clamp member 30A and the clamp plate portion 33 of the second clamp member 30B are placed on the grommet 20 at opposite sides thereof in the second direction perpendicular to the first direction. Furthermore, the engagement pawl portion 36 of the second clamp member 30B is locked to the first clamp member 30A through the engagement hole 31 of the first clamp member 30A, and, in this state, the fastenable portion 37 of the second clamp member 30B is fastened to the first clamp member 30A by use of the bolt 40 and the nut 42 serving as the clamping fastener. This fastening involves reduction in the distance between the first clamp member 30A and the clamp plate portion 33 of the second clamp member 30B, thus allowing the first and second clamp members 30A, 30B to achieve the clamp of the grommet 20 in the second direction.

This clamp elastically deforms the grommet 20 to bring the inner peripheral surfaces 22a surrounding the respective hose insertion holes 21 in the grommet 20 into reliable close contact with the respective outer peripheral surfaces of the pilot hoses 16. The close contact makes respective holdings of the pilot hoses 16 by the hose holding portion 22 of the grommet 20 be reliable, and enhance sealing performance between the hose holding portion 22 and each of the pilot hoses 16.

The clamp is performed at a position where the respective lower edge surfaces of the side plate portions 34, 35 of the second clamp member 30B make contact with the respective upper surfaces of the displacement restraint protrusions 23b of the sealing portion 23 of the grommet 20. The contact further makes the restraint of the first and second clamp members 30A, 30B from downward displacement, i.e., displacement in a direction of approaching the floor plate 17, relative to the grommet 20 be more reliable.

4) The grommet 20 is placed on the floor plate 17 at such a position that the positioning portion 25 of the grommet 20 is fitted into the through-hole 18. This brings the sealing surface 23a, i.e., the lower surface of the sealing portion 23 of the grommet 20, into contact with the upper surface of the inner peripheral edge portion of the floor plate 17 around the through-hole 18 over the entire circumference of the upper surface.

5) In the above state, the fastenable portion 37 integrally joined to the first clamp member 30A is fastened to the floor plate 17 by use of the bolt 44 and the nut 46 serving as the anchoring fastener. This fastening involves respective downward displacements of the first and second clamp members 30A, 30B integrally with the fixing section 38, i.e., respective displacements in a direction of approaching the floor plate 17. These displacements allow the side plate portions 34, 35 of the second clamp member 30B to press downward the respective displacement restraint protrusions 23b of the sealing portion 23 to thereby bring the sealing surface 23a of the sealing portion 23 into close contact with the inner peripheral edge portion of the floor plate 17 around the through-hole 18. This causes the grommet 20 to fully close the through-hole 18, thus preventing dust or the like to be intruded into the operator's cab 11 through the through-hole 18.

As above, according to the holder HD1, the fixture including the first and second clamp members 30A, 30B, which constitute the clamp section, and the fixing section 38 enables to be achieved the two close contacts: the close contact of each of the inner peripheral surfaces 22a of the grommet 20 with the outer peripheral surface of each of the pilot hoses 16; and the close contact of the sealing surface 23a of the grommet 20 with the inner peripheral edge portion of the floor plate 17 around the through-hole 18. This makes it possible to achieve, with a simple structure, reliable holding of the pilot hoses by the grommet 20 and prevention of dust or the like from intrusion into the operator's cab 11 through the through-hole 18.

The present invention permits the shape of the grommet 20 to be appropriately modified. For example, in the first and second clamp members 30A, 30B, the region to be brought into contact with the displacement restraint protrusions 23b is not limited to the side plate portions 34, 35 but permitted to be the clamp plate portion 33. Besides, the displacement restraint protrusion 23b may be divided into a plurality of spaced pieces.

In a situation where the restraint of the first and second clamp members 30A, 30B from relative displacement to the grommet 20 (relative displacement in a direction of approaching the floor plate 17) can be achieved only by means of pressure contact or biting of the first and second clamp members 30A. 30B against the grommet 20 as shown in FIGS. 5 and 6, the displacement restraint protrusions 23b are not absolutely required. The presence of the displacement restraint protrusions 23b is, however, desirable because of enabling the restraint against the relative displacement to be more reliable and facilitates positioning of the first and second clamp members 30A, 30B relatively to the grommet 20.

The clamp section in the present invention can have a shape and a structure other than that of the first and second clamp members 30A, 30B in the first embodiment, the shape and the structure being permitted to be various changed and modified. For example, the first and second clamp members may have the same shape, which allows mass productivity thereof to be enhanced. One example of this will be shown in FIGS. 7 and 8 as a second embodiment of the present invention.

Here is shown a holder HD2 including first and second clamp members 30C, 30D, both of which have a shape similar to the second clamp member 30B in the first embodiment, i.e., a shape having a clamp plate portion 33 and a pair of side plate portions 34, 35 extending from respective opposite ends of the clamp plate portion 33 toward a counterpart one of the clamp members. Differently from the first embodiment, the distal end of each of the side plate portions 34, 35 on a side opposite to the clamp plate portion 33 is formed as a fastenable portion 3T protruding outward. Each of the fastenable portions 37' of one of the first and second clamp members 30C, 30D is fastened to a corresponding one of the other of the fastenable portions 37' at a position corresponding to an intermediate part of the grommet 20, by use of a bolt 40 and a nut 42, thereby allowing the respective clamp plate portions 33 of the first and second clamp members 30C, 30D to achieve clamp of the grommet 20.

Figure 7:
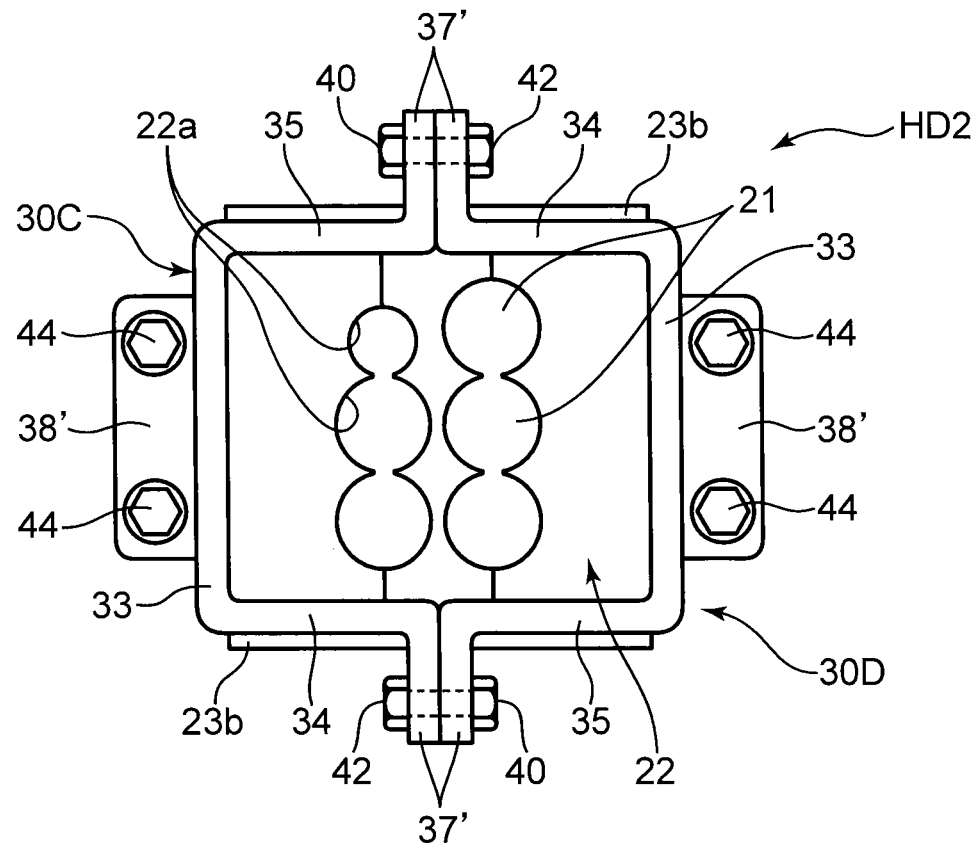
FIG. 7 is a top plan view of a cord-like member holder according to a second embodiment of the present invention.
Figure 8:
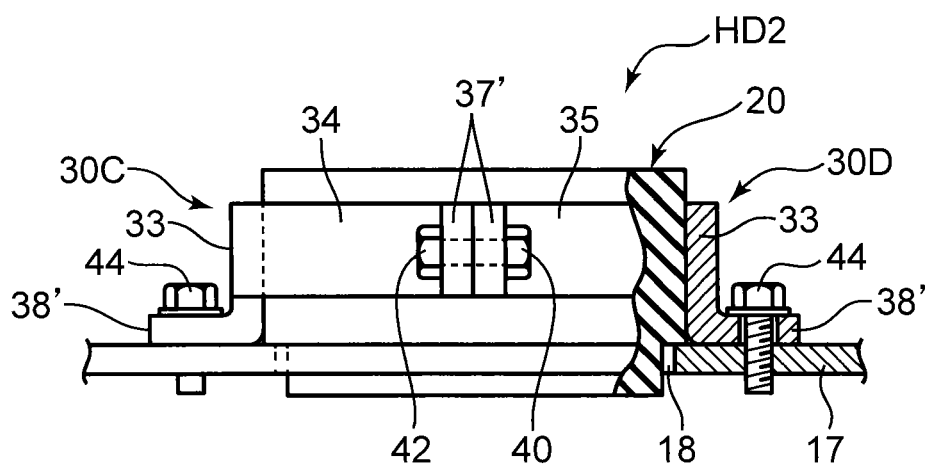
FIG. 8 is a partially-sectional front view of the cord-like member holder according to the second embodiment.

In the second embodiment, allowing the first and second clamp members 30C, 30D to have the same shape is achieved by, for example, joining a fixing section 38' as shown in FIGS. 7 and 8 to each of the first and second clamp members 30C, 30D. The fixing sections 38' shown in FIGS. 7 and 8 are integrally joined to the respective clamp plate portions of the first and second clamp members 30C, 30D to be fastened to a floor plate 17. These fastenings cause the first and second clamp members 30C. 30D to be displaced toward the floor plate 17.

Figure 9:
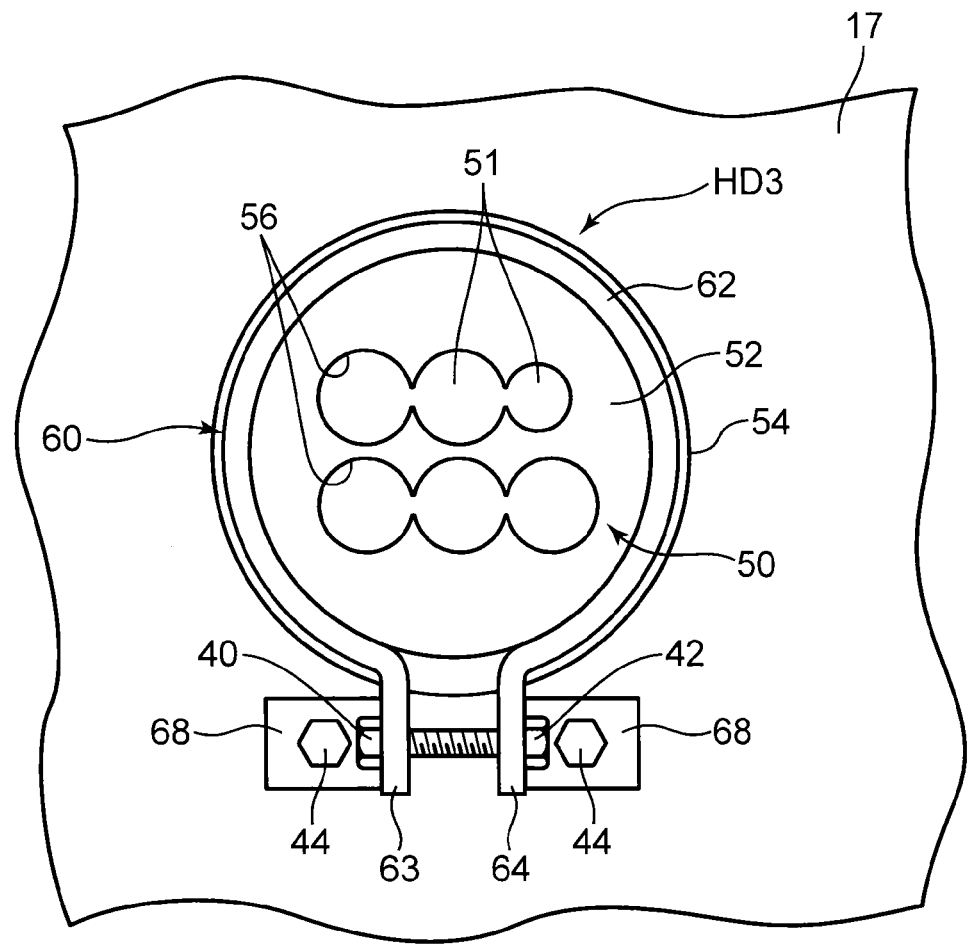
FIG. 9 is a top plan view of a cord-like member holder according to a third embodiment of the present invention.
Figure 10:
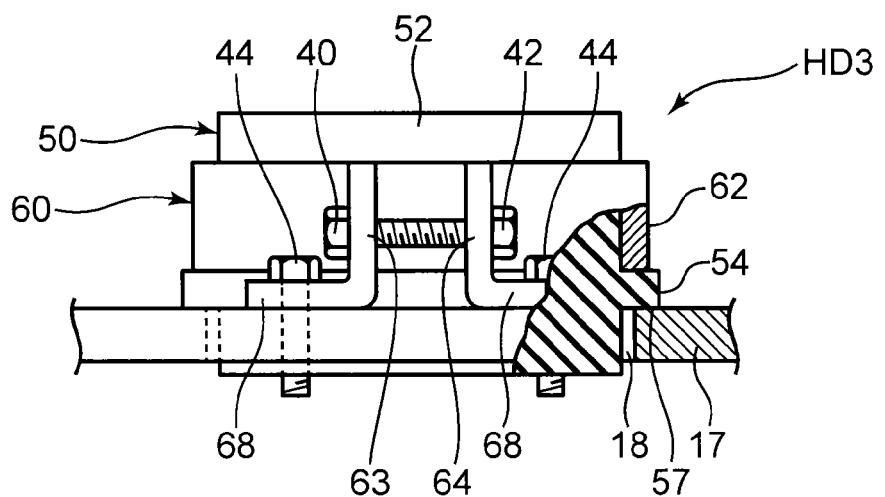
FIG. 10 is a partially-sectional front view of the cord-like member holder according to the third embodiment.
Figure 11:
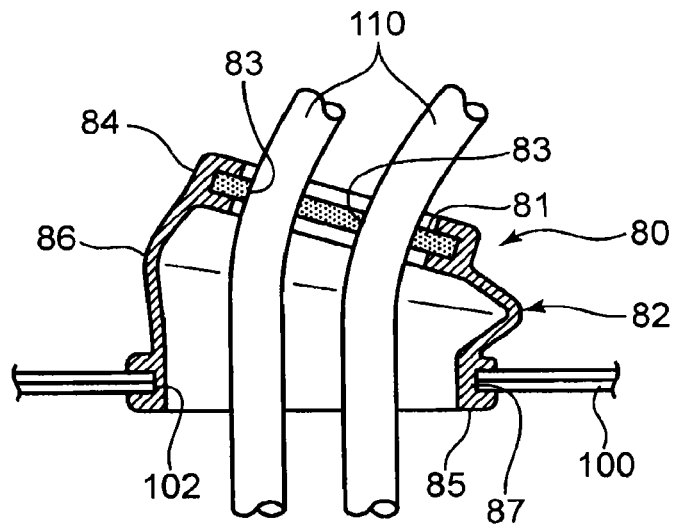
FIG. 11 is a sectional view of a first conventional cord-like member holder.
Figure 12:
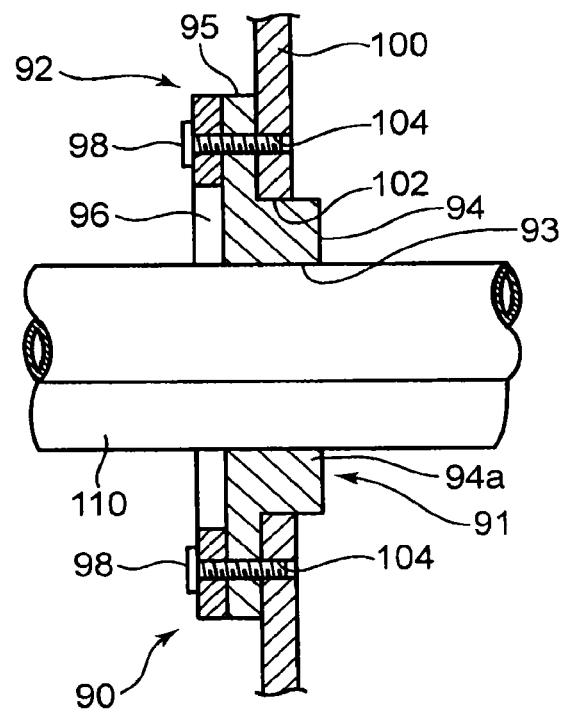
FIG. 12 is a sectional view of a second conventional cord-like member holder.

Alternatively, the clamp section in the present invention may be composed of a single member. One example of this will be shown in FIGS. 9 and 10 as a third embodiment of the present invention.

Here is shown a holder HD3 which includes: a grommet 50; a single clamp member 60 constituting a clamp section; and a pair of fixing sections 68.

The grommet 50 has a grommet body 52 with a cylindrical outer peripheral surface. The grommet body 52 includes a lower portion having an outer diameter greater than that of the remaining portion of the grommet body 52 to thereby form a displacement restraint protrusion 54 similar to the displacement restraint protrusions 23b in the first embodiment. The grommet body 52 has a plurality of inner peripheral surfaces 56 surrounding respective cord-like member insertion holes 51. The grommet 50 has a lower surface serving as a sealing surface 57 capable of making into close contact with an upper portion of an inner peripheral edge portion of the floor plate 17 around a through-hole 18 formed in the floor plate 17.

The clamp member 60 integrally includes a clamp plate portion 62 and a pair of fastenable portions 63, 64. The clamp plate portion 62 is shaped into an arcuate strip capable of surrounding the grommet 50 except for a part of a circumference thereof. The fastenable portions 63, 64 protrude from respective opposite ends of the clamp plate portion 62 outward and radially of the grommet 50. At a height position where the clamp plate portion 62 comes into contact with an upper surface of the displacement restraint protrusion 54, the fastenable portions 63, 64 are fastened to each other, i.e., tightened in a direction of approaching each other, by a bolt 40 and a nut 42 serving as a clamping fastener, thereby reducing the diameter of the clamp plate portion 62 to cause the clamp plate portion 62 to clamp the grommet 50 at a radial outside thereof. This clamp brings the inner surfaces 56 of the grommet 50 into close contact with respective outer peripheral surfaces of not-shown cord-like members, such as a pilot hose, inserted into respective cord-like member insertion holes 51 surrounded by the inner surfaces 56, respectively.

The pair of fixing sections 68 are integrally joined to respective appropriate regions of the clamp plate portion 62, in the shown embodiment, the respective fastenable portions 63, 64. Specifically, the fixing sections 68 extend from respective lower ends of the fastenable portions 63, 64, outward in opposite directions, each of the fixing sections 68 having a bolt insertion hole for allowing a bolt 44 constituting an anchoring fastener to be inserted into the bolt insertion hole. The fixing sections 68 can be fastened to the floor plate 17 by the bolts 44 inserted into the bolt insertion holes, and these fastenings bring the sealing surface 57 of the grommet 50 into close contact with the upper surface of the inner peripheral edge portion of the floor plate 27 around the through-hole 18. Thus, the holder HD3 also enables reliable holding of the cord-like members and reliable closing of the through-hole 18 to be achieved.

As mentioned above, provided is an improved cord-like member holder for holding a cord-like member inserted into a through-hole provided in a partition wall of an operator's cab of a working machine, the holder being capable of achieving reliable holding of the cord-like member and reliable sealing in the through-hole, with a simple structure. The cord-like member holder includes: a grommet made of elastic material to have an inner peripheral surface surrounding a cord-like member insertion hole for allowing the cord-like member to be inserted into the cord-like member insertion hole and a sealing surface capable of making close contact with an inner peripheral edge portion of the partition wall around the through-hole, over an entire circumference of the inner peripheral edge portion; and a fixture for fixing the grommet to the partition wall while holding the grommet and bringing the sealing surface into close contact with the inner peripheral edge portion of the partition wall around the through-hole. The fixture includes: a clamp section configured to clamp the grommet at an outer side thereof to thereby elastically deform the grommet so as to bring the inner peripheral surface of the grommet into close contact with an outer peripheral surface of the cord-like member inserted into the cord-like member insertion hole of the grommet; and a fixing section joined to the clamp section so as to make an integral displacement with the clamp section and configured to be fastened to the partition wall in a fastening direction perpendicular to the partition wall to thereby fix the grommet to the partition wall. Furthermore, the clamp section is configured to clamp the grommet so as to be restrained from a relative displacement to the grommet in a direction of approaching the partition wall; and the fixing section is configured to be fastened to the partition wall in the fastening direction perpendicular to the partition wall to involve displacement of the clamp section and the grommet clamped by the clamp section in the fastening direction to thereby bring the sealing surface into close contact with the partition wall.

The cord-like member holder of the present invention can achieve reliable holding of the cord-like member and reliable sealing in the through-hole, with a simple structure comprising the grommet and the fixture fixable to the partition wall while clamping the grommet. Specifically, the clamp section of the fixture clamps the grommet to elastically deform the grommet to bring the inner peripheral surface of the grommet, i.e., the inner surface surrounding the cord-like member insertion hole, into close contact with the outer peripheral surface of the cord-like member, thereby allowing the grommet to hold the cord-like member more reliably. In addition, the fixing section joined to the clamp section is fastened to the partition wall in the direction perpendicular to the partition wall, in the state of restraint of the clamp section from the displacement relative to the grommet in a direction of approaching the partition wall, thereby displacing the grommet in the direction perpendicular to the partition wall to bring the sealing surface of the grommet into close contact with the inner peripheral edge portion of the partition wall around the through-hole to reliably prevent dust or the like from intruding from an outside into an inside of the operator's cab through the through-hole.

The restraint of the clamp section from the relative displacement to the grommet may be achieved to some extent only by the pressed contact of the clamp section with an outer peripheral surface of the grommet while involving elastic deformation of the grommet, depending on a degree of pressing, e.g., a level of biting, the restriction against relative displacement of the clamp section with respect to the grommet can be achieved to some extent; however, it is more preferable that the grommet includes a clampable portion to be clamped by the clamp section and a displacement restraint protrusion protruding outward beyond the clampable portion at a position closer to the sealing surface than the clampable portion so as to make contact with the clamp section to thereby restrain the clamp section from the relative displacement to the grommet. The displacement restraint protrusion makes the restraint of the clamp section from the relative displacement be more reliable, thus further ensuring the close contact of the sealing surface with the partition wall.

In the case where the clamp section has an opposite surface on a side opposite to the partition wall and the opposite surface is farther from the partition wall than an end of the cord-like member insertion hole of the grommet, it is preferable that the grommet includes a contact prevention portion which protrudes, at a position between the cord-like member insertion hole and the clamp section, in a direction away from the partition wall beyond the end of the cord-like member insertion hole, to prevent the cord-like member inserted into the cord-like member insertion hole from contact with the clamp section. The contact prevention portion, which is a part of the grommet made of elastic material, can effectively protect the cord-like member from damage due to contract with the clamp section.

Preferably, the grommet has a slit extending across the cord-like member insertion hole to split at least a part of the grommet in a split direction perpendicular to an axial direction of the cord-like member insertion hole, and the clamp section is configured to clamp the grommet at opposite sides in the split direction. The slit, splitting the grommet across the cord-like member, allows the cord-like member to be easily inserted into the cord-like member insertion hole. Furthermore, in spite of the splitting, the clamp of the grommet by the clamp section in the direction parallel to the split direction can bring the inner peripheral surface of the grommet surrounding the cord-like member insertion hole into more reliable close contact with the outer peripheral surface of the cord-like member.

Preferably, the clamp section includes: a first clamp member configured to come into contact with the grommet at one of opposite sides of the grommet in a clamping direction of clamp by the clamp section; a second clamp member configured to come into contact with the grommet at a side opposite to the first clamp member; and a clamping fastener configured to fasten the first and second clamp members to each other in the clamping direction to cause the first and second clamp members to clamp the grommet between the first and second clamp members. Thus dividing the clamp section into the first clamp member and the second clamp member facilitates the disposition of the clamp section around the grommet, while the fastening of the first and second clamp members to each other can bring the inner peripheral surface of the grommet into close contact with the outer peripheral surface of the cord-like member. In this case, the fixing section only has to be joined to at least one of the first and second clamp members.

This application is based on Japanese Patent application No. 2013-247226 filed in Japan Patent Office on Nov. 29, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A cord-like member holder for holding a cord-like member inserted into a through-hole provided in a partition wall of an operator's cab of a working machine, comprising:
   a grommet made of elastic material to have an inner peripheral surface surrounding a cord-like member insertion hole for allowing the cord-like member to be inserted into the cord-like member insertion hole and a sealing surface capable of making close contact with an inner peripheral edge portion of the partition wall around the through-hole, over an entire circumference of the inner peripheral edge portion; and
   a fixture for fixing the grommet to the partition wall while holding the grommet and bringing the sealing surface into close contact with the inner peripheral edge portion of the partition wall around the through-hole, the fixture includes a clamp section configured to clamp the grommet at an outer side of the grommet to thereby elastically deform the grommet so as to bring the inner peripheral surface of the grommet into close contact with an outer peripheral surface of the cord-like member inserted into the cord-like member insertion hole of the grommet, and a fixing section joined to the clamp section so as to make an integral displacement with the clamp section and configured to be fastened to the partition wall in a fastening direction perpendicular to the partition wall to thereby fix the grommet to the partition wall, wherein:
   the clamp section is configured to clamp the grommet so as to be restrained from a relative displacement to the grommet in a direction of approaching the partition wall; and
   the fixing section is configured to be fastened to the partition wall in the fastening direction perpendicular to the partition wall to involve displacement of the clamp section and the grommet clamped by the clamp section in the fastening direction to thereby bring the sealing surface into close contact with the partition wall.

2. The cord-like member holder as defined in claim 1, wherein the grommet includes a clampable portion to be clamped by the clamp section and a displacement restraint protrusion protruding outward beyond the clampable portion at a position closer to the sealing surface than the clampable portion so as to make contact with the clamp section to thereby restrain the clamp section from the relative displacement to the grommet.

3. The cord-like member holder as defined in claim 1, wherein the clamp section has an opposite surface on a side opposite to the partition wall, the opposite surface being farther from the partition wall than an end of the cord-like member insertion hole of the grommet, and the grommet includes a contact prevention portion which protrudes, at a position between the cord-like member insertion hole and the clamp section, in a direction away from the partition wall beyond the end of the cord-like member insertion hole, to prevent the cord-like member inserted into the cord-like member insertion hole from contact with the clamp section.

4. The cord-like member holder as defined in claim 1, wherein the grommet has a slit extending across the cord-like member insertion hole to split at least a part of the grommet in a split direction perpendicular to an axial direction of the cord-like member insertion hole, and the clamp section is configured to clamp the grommet at opposite sides in the split direction.

5. The cord-like member holder as defined in claim 1, wherein the clamp section includes: a first clamp member configured to come into contact with the grommet at one of opposite sides of the grommet in a clamping direction of clamp by the clamp section; a second clamp member configured to come into contact with the grommet at a side opposite to the first clamp member; and a clamping fastener configured to fasten the first and second clamp members to each other in the clamping direction to cause the first and second clamp members to clamp the grommet between the first and second clamp members.

* * * * *